G. W. SEXTON & M. A. BLOWERS.
DIRIGIBLE HEADLIGHT.
APPLICATION FILED NOV. 20, 1915.

1,187,185.

Patented June 13, 1916.
2 SHEETS—SHEET 1.

Witnesses
C. A. Beall
H. J. Riley

Inventors
G. W. Sexton,
M. A. Blowers.
By N. Randolph Jr.
Attorney

G. W. SEXTON & M. A. BLOWERS.
DIRIGIBLE HEADLIGHT.
APPLICATION FILED NOV. 20, 1915.

1,187,185.

Patented June 13, 1916.
2 SHEETS—SHEET 2.

Inventor
G. W. Sexton,
M. A. Blowers.

Witnesses

UNITED STATES PATENT OFFICE.

GEORGE W. SEXTON AND MAURICE A. BLOWERS, OF ROME, NEW YORK; SAID BLOWERS ASSIGNOR TO WILLIAM E. JONES, OF ROME, NEW YORK.

DIRIGIBLE HEADLIGHT.

1,187,185.   Specification of Letters Patent.   Patented June 13, 1916.

Application filed November 20, 1915. Serial No. 62,539.

*To all whom it may concern:*

Be it known that we, GEORGE W. SEXTON and MAURICE A. BLOWERS, citizens of the United States, residing at Rome, in the county of Oneida and State of New York, have invented certain new and useful Improvements in Dirigible Headlights; and we do hereby declare the following to be a full, clear, and exact description of the invention, such as will enable others skilled in the art to which it appertains to make and use the same.

The invention relates to automatic headlights for automobiles and other motor vehicles.

The object of the present invention is to improve the construction of headlights for automobiles and other motor vehicles and to provide a simple, practical and comparatively inexpensive device of strong and durable construction and adapted to be readily applied to various automobiles and motor vehicles and capable of automatically swinging the head lights when the direction of the machine is changed and of maintaining the headlights in parallelism with the front wheel so that when a car is making a sharp turn the light will be thrown at an angle and in the proper direction to keep the path of the car lighted.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
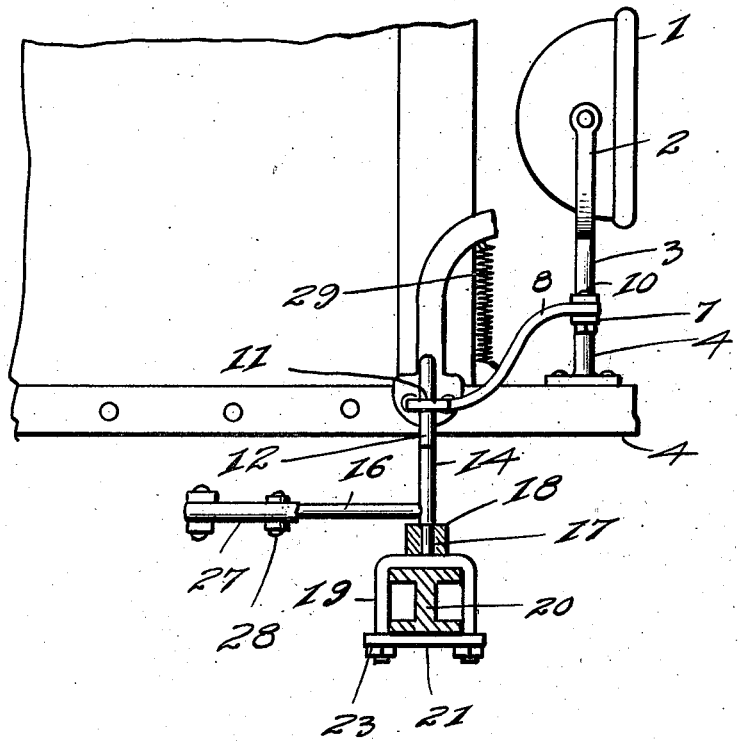
Figure 4:
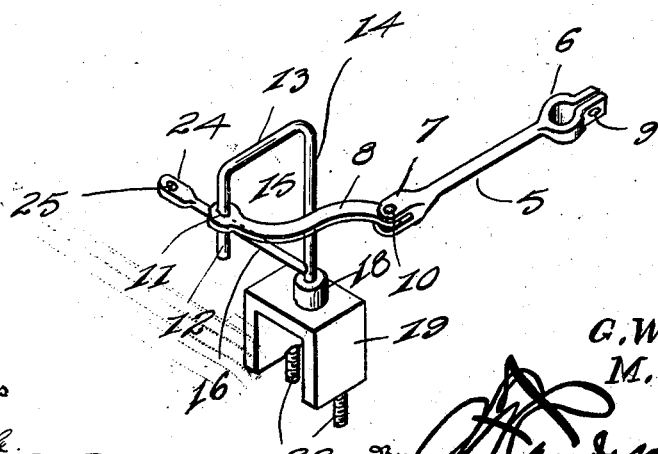
Figure 2:
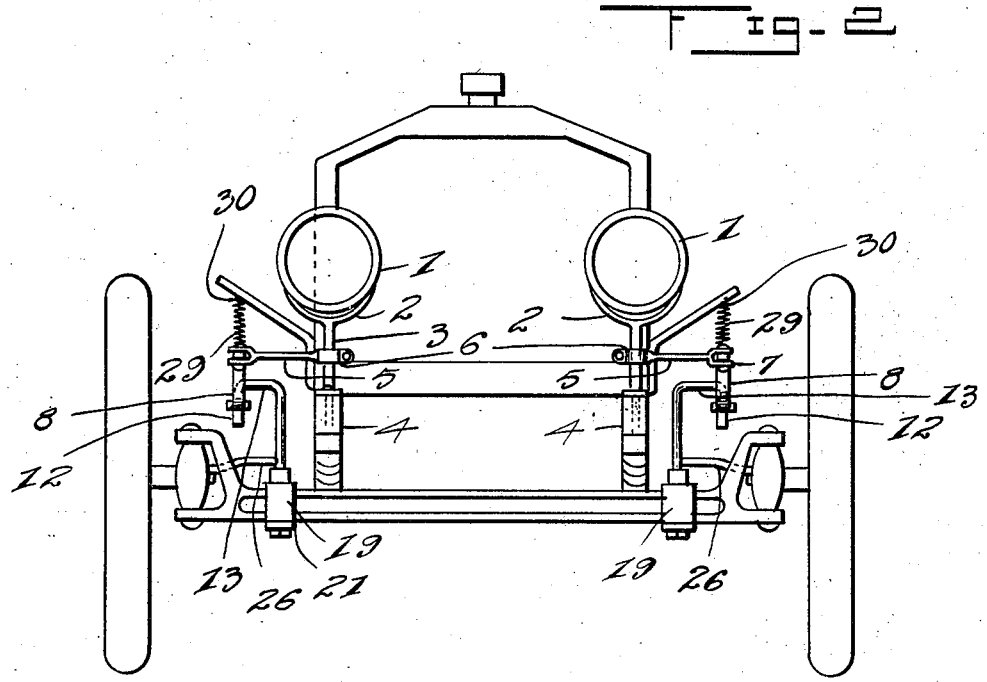
Figure 3:
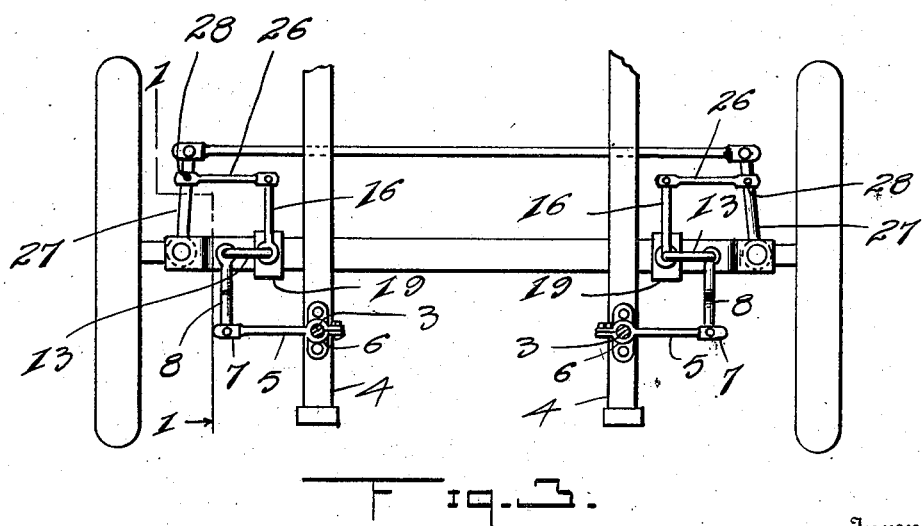

In the drawings, Figure 1 is a side elevation of a portion of an automobile provided with an automatic headlight constructed in accordance with this invention. Fig. 2 is a front elevation of the same. Fig. 3 is a reverse plan view. Fig. 4 is a detail perspective view of a portion of one of the devices for transmitting motion from the steering mechanism to the headlight.

Like numerals of reference designate corresponding parts in the several figures of the drawing.

In the accompanying drawings in which is illustrated the preferred embodiment of the invention 1—1 designates the headlight mounted in lamp brackets 2 of any desired construction provided with vertical pivots or stems 3 journaled in suitable bearings in permanently mounted brackets 4 carried by the body of the automobile or other motor vehicle at the front thereof. The bearings consist of vertical sockets and any suitable means may be employed for securing the stems or pivots of the lamp brackets. Secured to and extending outwardly from each of the stems or pivots is a horizontally disposed laterally projecting arm 5 provided at its inner end with a clamp 6 to engage and embrace the stem or pivot 3 and having its outer end 7 bifurcated to receive the front end of a side longitudinally disposed link or rod 8 of substantially sigmoidal shape and extending downwardly and rearwardly from the outer end of the arm. The clamp 6 is provided with a bolt or screw 9 and a bifurcated end 7 of the arm 5 is secured to the front end of the link by a suitable pivot 10. The rear end of the longitudinally disposed link is provided with an eye or opening 11 in which is arranged a vertically disposed portion 12 of an arched top 13 of a vertical arm 14, of a bell crank or angle lever 15. The vertical arm 14 is suitably connected at its lower portion with a rearwardly extending horizontal arm 16 and it is provided with a depending pivot 17 which is journaled in a suitable bearing 18 of an axle clip 19. The vertical arm or portion 14 extends upwardly from the rearwardly extending horizontal arm 16 and then outwardly in a horizontal direction to form the arched top 13 and is bent downwardly on the outer side thereof to provide the depending guiding portion 12 which operates in the eye or opening 11 of the link 8. This provides a slidable connection between the bell crank lever and the link 8 to permit the cushioning action of the springs of the vehicle and prevent the same from interfering with the operation of the device. The axle clip 19 which is approximately U-shaped straddles the front axle 20 and is provided at the bottom with a clip plate 21 secured on threaded terminal portions 22 of the axle clip by a nut 23.

The rear end 24 of the link 16 is connected by a suitable pivot 25 to the inner end of a transversely disposed link 26 and the latter extends outwardly from the arm 16 and is connected with the crank arm 27 of the adjacent steering knuckle 5, by a suitable pivot 28. The arms 16 and 27 are arranged in substantial parallelism and when the steering gear is operated to swing the front wheels laterally on their pivots the arms 16 at each side of the machine are swung in the same direction as the said crank arm 27 whereby the headlight will be simultaneously turned and will be maintained in substantial parallelism with the front wheels. When a car is making a sharp turn the lights will turn at the proper angle and will keep the path of the car lighted.

The rear end of the longitudinally disposed link 8 is preferably suspended from the mud-guard or mud-guard support by a spring 29 connected at its upper end 30 with the mud-guard or mud-guard brace and suitably secured at its lower end to the link 8 adjacent to the rear end thereof. The spring is adapted to form a support for the rear portion of the link to prevent the same from sagging and binding against the vertical guiding portion of the angle or bell crank lever. While a coiled spring is shown in the accompanying drawing for suspending the rear portion of the link 8, any other suitable means may of course be provided for this purpose. The coiled spring however will be found advantageous as it is adapted to readily yield to the movement of the parts in the steering of the machine.

What is claimed is—

1. An automatic headlight including a lamp bracket pivoted on a vertical axis and having a laterally projecting outwardly extending arm, a bell crank lever also pivoted on a vertical axis and having an arched laterally projecting arm provided with a pendant outer guiding portion, a link pivoted to the arm of the lamp bracket and slidably receiving the pendant guiding portion of the said lever and means for connecting the lever with the steering gear of an automobile.

2. An automatic headlight including a lamp bracket, pivotally mounted on a vertical axis, an axle clip provided with a vertical bearing, a bell crank lever including an arched laterally projecting arm having a depending pivot portion arranged in the said bearing, said lever being also provided with a rearwardly extending arm located above the bearing, the outer portion of the arched laterally extending arm constituting a guide, a member slidable on the guide and connected with the lamp bracket and means for connecting the rearwardly extending arm of the lever with the steering gear of an automobile.

3. An automatic headlight including a pivoted lamp bracket provided with a laterally extending arm, a bell crank lever pivoted on a vertical axis and having an arched laterally projecting arm provided with a terminal vertically disposed guiding portion, a link pivoted to the arm of the lamp bracket and provided with an opening receiving the guiding portion of the said lever, a spring connected with the link and yieldably supporting the same and means for connecting the lever with the steering gear of an automobile.

In testimony whereof we affix our signatures in presence of two witnesses.

GEORGE W. SEXTON.
MAURICE A. BLOWERS.

Witnesses:
EDWARD J. ARMSTRONG,
JOHN G. THORN.